Sept. 25, 1962 T. M. CONDELLO 3,055,139
CRAB TRAP
Filed Nov. 19, 1959 3 Sheets-Sheet 1

Thomas M. Condello
INVENTOR.

BY *Clarence A.O'Brien*
*and Harvey B. Jacobson*
Attorneys

Sept. 25, 1962 T. M. CONDELLO 3,055,139
CRAB TRAP
Filed Nov. 19, 1959 3 Sheets-Sheet 2

Thomas M. Condello
INVENTOR.

Sept. 25, 1962
T. M. CONDELLO
3,055,139
CRAB TRAP
Filed Nov. 19, 1959
3 Sheets-Sheet 3
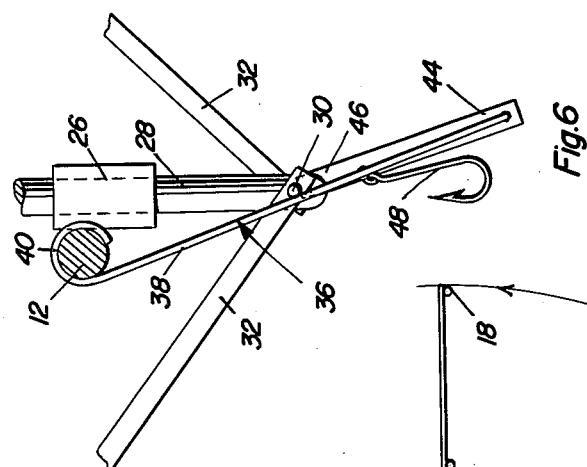
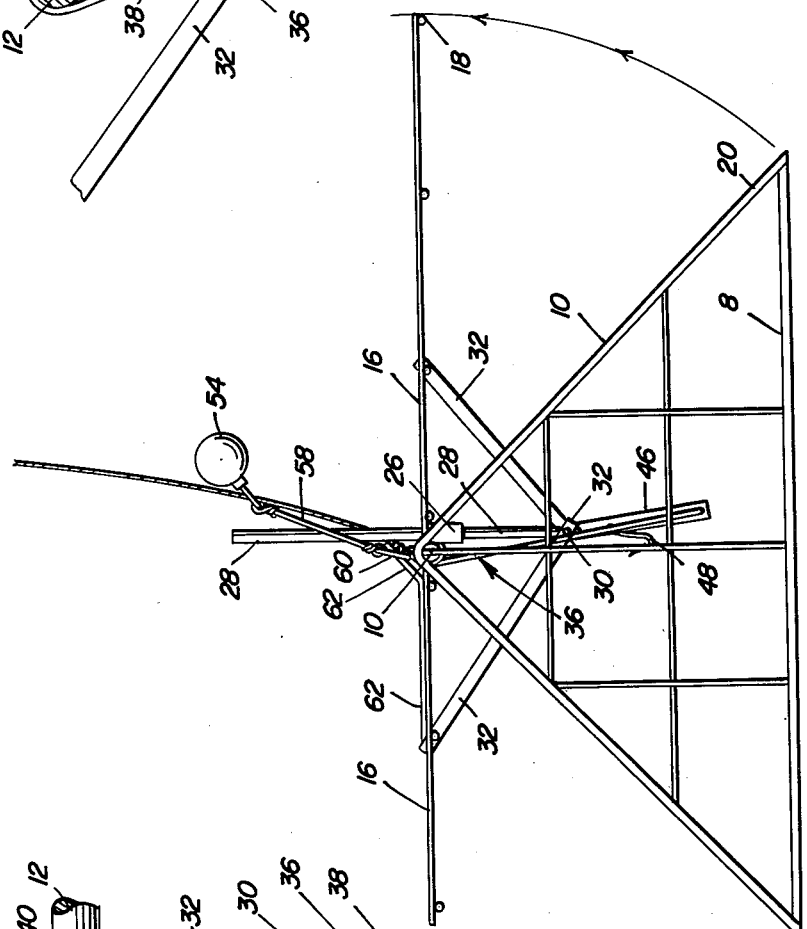
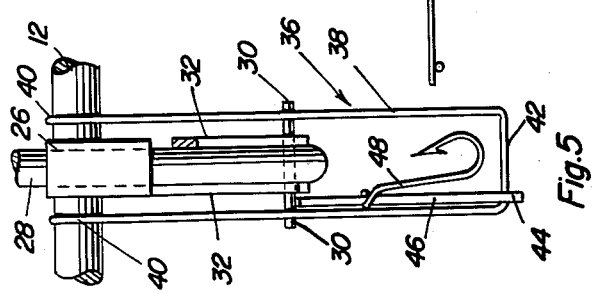
Thomas M. Condello
INVENTOR.

United States Patent Office 3,055,139
Patented Sept. 25, 1962

3,055,139
CRAB TRAP
Thomas M. Condello, 2918 S. 16th St., Philadelphia, Pa.
Filed Nov. 19, 1959, Ser. No. 854,140
11 Claims. (Cl. 43—61)

The present invention relates to certain new and useful improvements in a trap which is expressly and effectually constructed to catch crabs and a general objective of the instant invention is to structurally, functionally and otherwise improve upon similarly constructed and performing underwater and similarly-purposed traps.

In carrying out the principles of the invention, a trap has been evolved and produced wherein the body structure is of openwork construction for satisfactory crab-trapping needs and, for sake of convenience and compactness is preferably, but not necessarily, of general triangulate shape or form.

More specifically, novelty is predicated upon an openwork wire or an equivalent crab trap having a generally flat rectangular bottom, triangular upstanding integral walls and a rod extending between the apical upper ends of the end walls and serving as hinging means for a pair of downwardly swingable spring-closed gates or trapping doors.

The invention also features links so arranged as to provide a toggle and an actuating rod therefor connected to the knee thereof and operating perpendicularly through a bearing fixed to the top rod of the trap.

The invention also features the toggle and rod construction and a suspended substantially U-shaped bail or swing which carries a trigger-latch and also a fish hook which may be baited.

Of outstanding significance and importance in the overall concept is the novel signalling means which has been devised for use in this trap and which has to do with a float. Normally the float is submerged with the trap when the trap is set. When the trap is sprung the float is released and since it is provided with a ring attached to the anchoring and lowering as well as hoisting line, the float comes to the surface and gives the signal that the trap has been sprung.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 4 is an end elevation showing the parts in the relationship with the trap doors up and the trap "set" and ready to be triggered and released to make a catch and also to free the then inactive signalling means;

FIG. 5 is a view detailing the swingably mounted trigger carrying bail and showing how the trigger or latch is engaged with a retaining pin for setting and holding the trap set; and FIG. 6 is a view at right angles to FIG. 5 to further bring out the details of construction and their association and arrangement.

Figure 1:
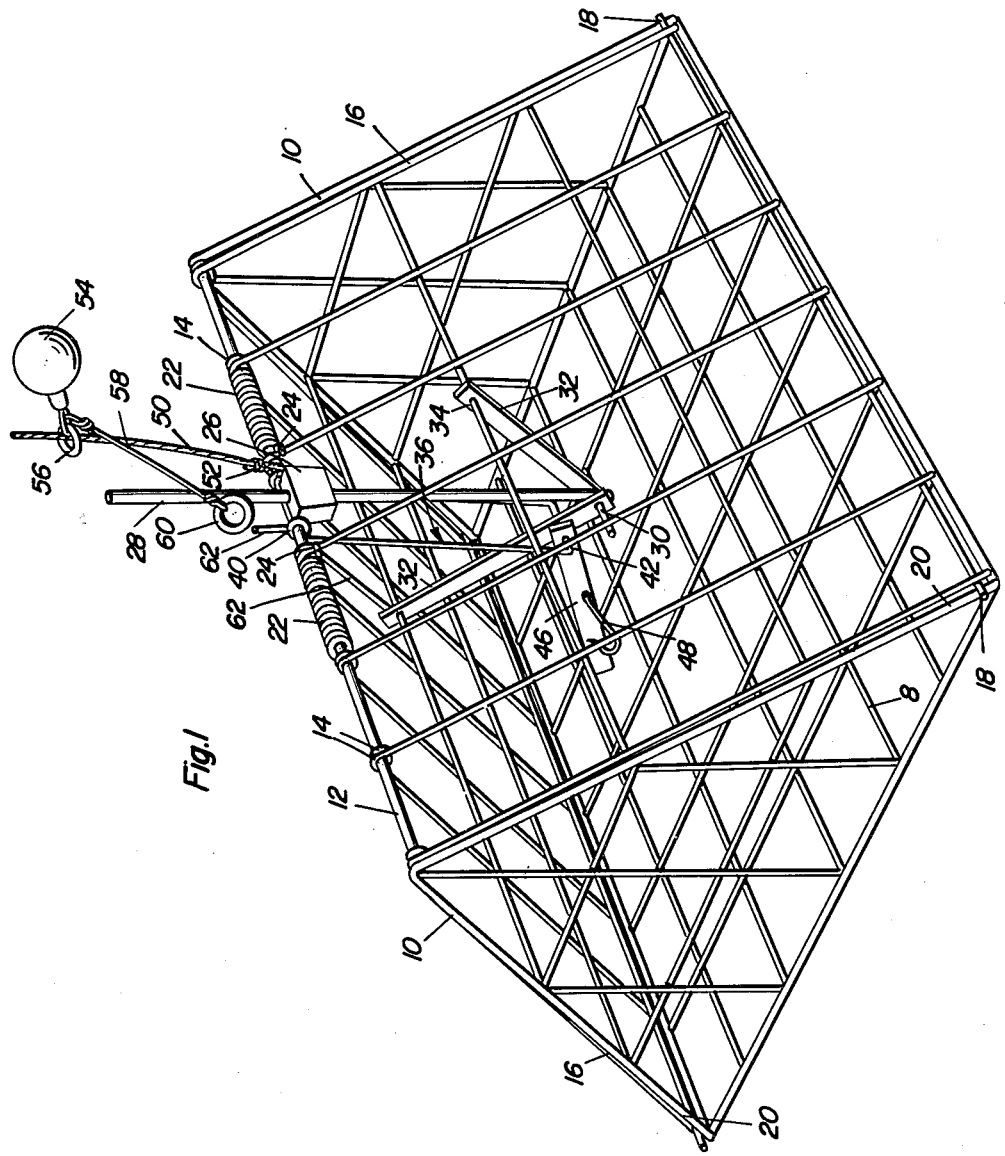
FIG. 1 is a view in perspective of a crab trap constructed in accordance with the invention showing the trap doors closed on the assumption that a catch has been made (crab not shown) and the purpose of which is to show how the signalling float has been released and is about to travel up the lifting and lowering line.
Figure 2:
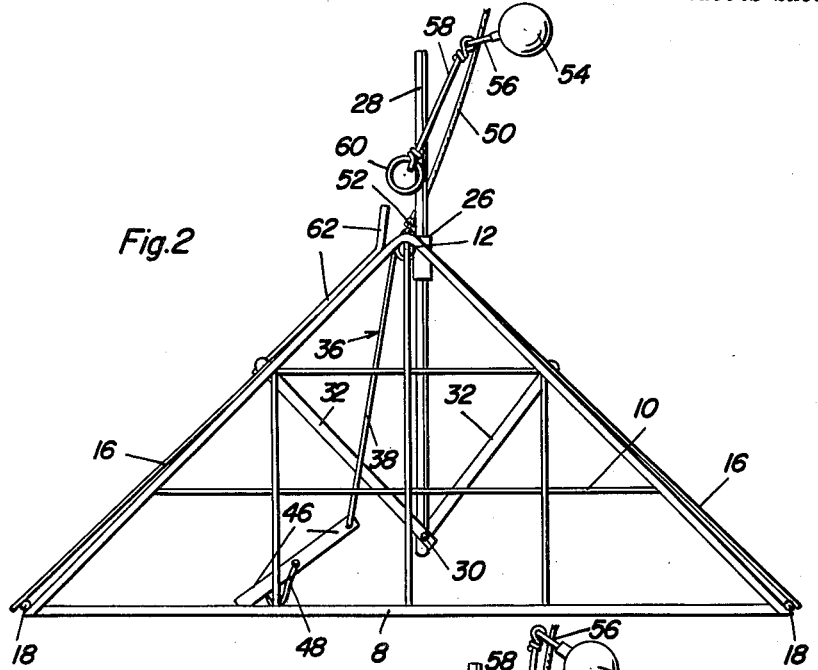
FIG. 2 is an end elevation of the construction seen in FIG. 1.
Figure 3:
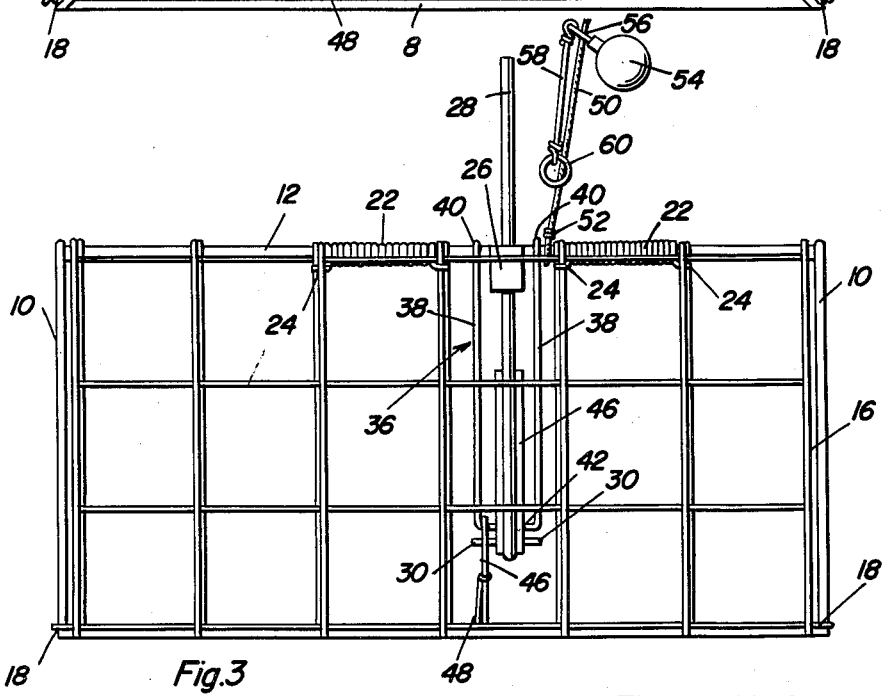
FIG. 3 is a side elevational view of the same.

Referring now to the drawings and to FIGS. 1 to 4, inclusive, it is to be reiterated that the shape shown is not a limiting factor. In other words, this trap could be of some other than triangulate shape. However, for compactness, convenience and lightness the shape depicted is preferred. In any event, this trap is characterized by an openwork wire or equivalent cage having a flat generally rectangular bottom 8 and upstanding triangular end frames 10 having upper apical ends between which a horizontal assembling and rigidifying rod, member or shaft 12 is connected. It is on this shaft that the attaching and hinging eyes 14 of the duplicate downwardly sloping normally closed trap doors or gates 16 are connected. The lower end portions of the anticlinal doors or gates have outstanding wire-ends 18 which strike against and rest upon the end frame wires 20 in a closed condition shown. As already touched upon, these components 16 may be treated either as doors or gates. Moreover, it will be evident from FIG. 1 that coil springs 22 are provided and are suitably anchored at 24 to exert the necessary downward bias on the gates for purposes of automatically closing the same with the assistance of gravity. It will be noticed that at the center of the rod or shaft there is a guide block 26 having a hole therethrough through which an operator in the form of a rod member 28 is slidable. The upper end of the rod member projects above the shaft 12 when the trap is closed and is such that it may be caught hold of to assist in setting the trap. For this reason the lower end of the rod member is connected by a hinge pin 30 with the inner converging ends of the toggle links 32. The outer end portions 34 of the links are hinged on convenient wires on the gates in the manner shown. Thus, it is through this toggle action that one may catch hold of the upper end of the rod 28 and pull up on it and transfer the necessary forces to the hinged doors to swing the same up to an open position as illustrated in FIG. 4. When the door is "up" against the tension of the springs 22 it is of course necessary to then rely on a retaining latch to accomplish the results depicted in FIGS. 4, 5 and 6. This calls for the use of a substantially U-shaped bail or swing which is also of wire and is denoted generally by the numeral 36. This part 36 has arms or limbs 38 the upper ends of which are fashioned into hooks 40 hinged over the cooperating portion of the shaft on opposite sides of the guide block 26. The limbs tend to straddle the rod and link assemblage or toggle means as best brought out in FIG. 5. The bight portion 42 has an end 44 of a trigger latch or prop 46 hingedly connected thereto and this prop 46 has its upper end arranged so that it may be engaged beneath one projecting end of the hinge pin 30 to thus "set" and keep the trap set until tripped. By baiting the hook 48 on the trigger latch it will be seen that an effort on the part of a crab to dislodge the bait will, of course, trigger the latch 46 and will allow the toggle means and also the spring means to come into play to automatically and forcibly swing the gates or doors down to the desired trapping position seen in FIG. 1.

It will be evident that with the construction shown the guess-work on the fisherman's part is virtually eliminated. In other words, in order to operate all that is required of the operator is to apply the bait, and then using the line 50 to lower the cage or trap to the bottom of the bay and then secure the line to a boat or pier (not shown). When the line is secured to the boat or pier it needs no attention until the signal is obtained that the trap has been sprung. It remains then to introduce the fact that the lower end portion 52 of the line is suitably attached to the shaft 12. Also, the signalling means takes the form of a simple float 54 havign a ring 56 slidable on the line 50. The float is also provided with an auxiliary trip line or element 58 having a keeper ring 60 on its free end. This ring 60 is connectible with a keeper finger 62 which is mounted to operate in the manner shown in FIG. 4. More specifically, the finger 62 has a long stem portion which is superimposed on the left-hand gate as seen in FIG. 4 and which terminates in an angularly bent free end portion which is engageable in the ring 60. When the gates are swung up, the keeper finger swings into line with the cooperating rod 23 and a sort of a pocket is provided in which the keeper ring 60 is retained until the trap is sprung or actuated. Naturally, when the gates swing down the keeper ring 60 is freed from the keeper finger 62 and consequently the float 54 by way of the ring 56 slides up the line 50 and gives the signal that the trap has operated. With this construction the operator of the trap may easily handle a series of such traps at the same time and more-or-less leisurely go from one trap to the other depending on whether the signal has ascended or not.

A significant feature of the toggle means should be taken into account here; namely, the locking of the gates when they are in a "down" position. More particularly, the toggle arms serve to raise as well as lower the gates and what is also important, they maintain and lock the gates when they are in a closed position. Both gates operate in unison. Then, too, the reader should observe that the gates cannot be opened by pulling up on one gate, even by applying straining force. Moreover, any animal caught in the trap would have to thrust both gates out and up simultaneously (which is unlikely) to escape from the trap.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A crab trap comprising an openwork cage having a generally flat bottom with upstanding rigid spaced parallel end frames, a rod member extending between the apical portions of said end frames and providing a shaft, a pair of trap doors having adjacent ends hingedly mounted on said shaft and springs on the shaft cooperable with the trap doors for normally urging the trap doors down to trap-closing positions, a guide fixed on said shaft, a vertical rod slidable in said guide with a portion projecting above the top of the shaft and a portion projecting below the bottom of the shaft, the last-named portion being hingedly connected to converging links, the outer ends of said links being hingedly connected to the respective doors and providing a toggle construction for opening the doors and setting the same against the tension of the closing springs, a substantially U-shaped bail hingedly suspended from a portion of the shaft adjacent said rod and toggle links, said bail having a bight portion, said bight portion provided with a pivoted element constituting a latch and said latch being engageable with a retaining pin provided at the junctional ends of the links and cooperating lower end of the rod.

2. The structure defined in claim 1 and a keeper finger fixed on a median portion of one door and having a laterally bent keeper element movable toward and from said rod, a lifting and lowering line, a signalling float slidably mounted on said line and provided with a flexible element, said flexible element in turn provided with a keeper ring and said keeper ring being releasably engageable with said keeper element.

3. A trap comprising a cage including a plurality of doors, means connecting the doors for operation in unison and for opening said doors and means for retaining said doors in open position, and operable by an occupant of the cage for releasing the doors, the second named means including a bail pivotally suspended in the cage, the first named means comprising a toggle operatively connecting the doors and operable in the bail, said second named means further including a latch pivotally mounted on the bail and engageable with the knee of the toggle for releasably retaining said toggle against closing movement.

4. A trap comprising a cage of generally triangular cross-section and including a pair of anticlinal doors pivotally mounted for vertical swinging on said cage and operable by gravity to closed position, a toggle connecting the doors for operation in unison, an actuating rod connected to the toggle for opening the doors, and occupant-actuated means in the cage for releasably securing the doors in open position, said means including a bail pivotally suspended in the cage astraddle the toggle, and a latch pivotally mounted on the bight portion of the bail and engageable with the knee of the toggle for retaining said toggle against closing movement.

5. A trap in accordance with claim 4, wherein said means further includes a bait hook mounted on the latch.

6. A crab trap comprising a foraminous cage including a bottom and generally triangular end walls, a rod extending between the top portions of said end walls and secured thereto, anticlinal doors journaled for vertical swinging movement on the rod and swingable downwardly to closed position, means connecting the doors for operation in unison and for actuating said doors, and means for securing the doors in open position, the first-named means including a toggle operatively connected to the doors and further including an actuating rod slidable on the first-named rod and pivotally connected to the knee portion of the toggle, the second-named means including a bail pivotally suspended from the rod astraddle the toggle, a latch pivotally mounted on the bight portion of the bail and engageable with said knee portion for retaining the toggle against closing movement, and a bait hook on said latch.

7. A crab trap comprising a submergible cage including a normally closed door, means for releasably securing the door in open position, a buoyant signal for indicating when the door is in closed position, and means operable by the door in response to opening movement thereof releasably connecting the signal to the cage for submergence therewith.

8. A crab trap comprising a submergible cage including a normally closed door, means for releasably securing the door in open position, a buoyant signal for indicating when the door is in closed position, and means operable by the door in response to opening movement thereof releasably connecting the signal to the cage for submergence therewith, the last named means including a ring connected to the signal, and a keeper on the door engageable in said ring.

9. A crab trap comprising a submergible cage including a normally closed door, means for releasably securing the door in open position, a buoyant signal for indicating when the door is in closed position, and means operable by the door in response to opening movement thereof releasably connecting the signal to the cage for submergence therewith, the first named means comprising a rod slidably mounted on the cage and operatively connected to the door, the last named means including a ring connected to the signal, and a keeper on the door insertable through the ring and, when the door is in open position, engageable with the rod for retaining said ring on said keeper.

10. A crab trap in accordance with claim 9 wherein said trap further includes a lowering and lifting line connected to the cage, and means slidably connecting the signal to said line.

11. A trap comprising a cage including a bottom and upstanding, spaced opposed end frames, a member extending between said end frames in upwardly vertically spaced relation to the bottom, a pair of doors hingedly mounted for vertical swinging movement on the member and swingable downwardly to closed position, an operator for the doors slidably mounted on the member, a toggle operatively connecting said operator to the doors, a bail pivotally suspended from the member astraddle the toggle, a latch pivotally mounted on the bail and engageable with the knee portion of the toggle for releasably securing said toggle in extended position with said doors in an upwardly, open position, and means operable by an occupant of the cage for disengaging the latch from the toggle.

References Cited in the file of this patent

UNITED STATES PATENTS

| | | |
|---|---|---|
| 66,550 | Badger | July 9, 1867 |
| 235,553 | Morris | Dec. 14, 1880 |
| 750,677 | Morawetz | Jan. 26, 1904 |
| 1,189,631 | Schueller | July 4, 1916 |
| 1,722,879 | Abel | July 30, 1929 |
| 2,903,718 | Wright | Sept. 15, 1959 |

FOREIGN PATENTS

| | | |
|---|---|---|
| 36,671 | Germany | Aug. 14, 1886 |
| 20,698 | Great Britain | of 1890 |